(12) United States Patent
Deedwaniya et al.

(10) Patent No.: US 8,136,092 B2
(45) Date of Patent: *Mar. 13, 2012

(54) MULTI-ATTRIBUTE DYNAMIC LINK LIBRARY PACKAGING

(75) Inventors: Anuja Deedwaniya, Poughkeepsie, NY (US); Chauho M. Leung, Hopewell Junction, NY (US); Barry L. Lichtenstein, Highland, NY (US); Eric L. Porter, Wappingers Falls, NY (US); David J. Sudlik, West Shokan, NY (US); Richard Tallman, Saugerties, NY (US)

(73) Assignee: International Business Machines Corporation, Armonk, NY (US)

( * ) Notice: Subject to any disclaimer, the term of this patent is extended or adjusted under 35 U.S.C. 154(b) by 621 days.

This patent is subject to a terminal disclaimer.

(21) Appl. No.: 12/365,227

(22) Filed: Feb. 4, 2009

(65) Prior Publication Data
US 2009/0144708 A1    Jun. 4, 2009

Related U.S. Application Data

(63) Continuation of application No. 10/675,117, filed on Sep. 30, 2003, now Pat. No. 7,519,951.

(51) Int. Cl.
*G06F 9/44* (2006.01)
*G06F 9/45* (2006.01)
(52) U.S. Cl. ......... 717/122; 717/140; 717/162; 719/331
(58) Field of Classification Search .......... 717/120–123, 717/140–167; 719/331, 332
See application file for complete search history.

(56) References Cited

U.S. PATENT DOCUMENTS

| | | | |
|---|---|---|---|
| 5,519,866 | A | 5/1996 | Lawrence et al. |
| 5,872,973 | A | 2/1999 | Mitchell et al. |
| 5,923,882 | A | 7/1999 | Ho et al. |
| 5,925,095 | A | 7/1999 | High, Jr. et al. |
| 5,930,795 | A | 7/1999 | Chen et al. |

(Continued)

FOREIGN PATENT DOCUMENTS
EP    0908817 A2    4/1999
(Continued)

OTHER PUBLICATIONS

Use method overloading in Java, [online]; [retrieved on Nov. 29, 2007]; retrieved from the Internet http://articles.techrepublic.com.com/5100-22-5074021.html.

*Primary Examiner* — Anna Deng
*Assistant Examiner* — Qing Chen
(74) *Attorney, Agent, or Firm* — Cantor Colburn LLP; William A. Kinnaman, Jr.

(57) ABSTRACT

A system for packaging a dynamically linked computer program function includes a compiler configured to compile a source file iteratively to create a plurality of corresponding object files, the source file associated with a specific computer program function having an established an attribute, with each attribute exhibiting a plurality of at least one of variations, characteristics and parameters, wherein each iteration of the compiling the source file results in the plurality of object files having the specific computer program function but with each object file having distinct attributes from one another; and a linker configured to link the plurality of resulting object files to create a single executable file, such that the single executable file comprises different versions of the specific computer program function; and wherein the single executable file is configured to facilitate choice of a selected version of the specific computer function.

12 Claims, 4 Drawing Sheets

U.S. PATENT DOCUMENTS

| | | |
|---|---|---|
| 5,974,470 A | 10/1999 | Hammond |
| 6,115,550 A | 9/2000 | Hunter et al. |
| 6,253,257 B1 | 6/2001 | Dundon |
| 6,295,642 B1 | 9/2001 | Blandy |
| 6,334,213 B1 | 12/2001 | Li |
| 6,415,434 B1 | 7/2002 | Kind |
| 6,442,752 B1 | 8/2002 | Jennings et al. |
| 6,499,137 B1 | 12/2002 | Hunt |
| 6,735,598 B1 | 5/2004 | Srivastava |
| 7,299,462 B2 | 11/2007 | Shann et al. |

FOREIGN PATENT DOCUMENTS

| | | |
|---|---|---|
| JP | 11110194 A | 4/1999 |
| JP | 2001154831 A | 6/2001 |

MULTI-ATTRIBUTE DYNAMIC LINK LIBRARY PACKAGING

CROSS-REFERENCE TO RELATED APPLICATION

This application is a continuation of U.S. patent application Ser. No. 10/675,117, filed Sep. 30, 2003, the disclosure of which is incorporated by reference herein in its entirety.

BACKGROUND

This invention is related to Dynamic Link Libraries (DLL) and a general and flexible operating system function for building and loading multi-attribute Dynamic Link Library packages.

As the hardware, operating system and application software evolve, the dynamic link library (DLL) users and providers, both from the operating system house and application developers, are faced with an increased demand in providing and employing multiple varieties of dynamic link libraries for different application attributes within a given operating system. When multiplied by the number of operating systems that application providers support, the task of building and maintaining multiple DLLs for multiple operating systems is becoming increasingly more difficult. For example, 64-bit computers and operating systems have been available for some time now and the 64-bit applications, and DLLs are on the rise, however, the majority of usage still employs legacy 32-bit applications.

In addition to the 64-bit and 32-bit application DLLs, there are a number of different attributes from various operating system environments that an application provider has to consider. For example, EBCDIC based and/or ASCII based operating systems require different DLLs. While it is technically feasible to design an application to be able to handle both EBCDIC and ASCII based operations, the programming logic is becoming very complicated, error prone, and susceptible to performance degradation. Another attribute for consideration is floating point format. While most operating systems support the IEEE 754 floating point, there are still a huge number of vendor software and customer applications depending on z/OS® Hex floating point support. Another key operating system attribute is the program linkage. For z/OS®, there are traditional operating system linkage and high performance linkage. These linkages employ different linkage conventions and different general-purpose register (GPR) considerations. It should readily be appreciated that the list of different attributes will potentially grow as a natural result of electronic computing evolution coupled with maintaining compatibility and interoperability that customers demand.

As the e-business evolves, the need for supporting heterogeneous operating environments becomes increasingly important. Application providers are more inclined to develop a common code base to support multiple operating environments. How to package these applications and DLLs is one of the many problems facing application providers in this emerging cross platform application/DLL environment. Therefore, what is needed is means for an operating system to provide support to facilitate the multi-attribute nature of applications and DLLs for future development.

BRIEF SUMMARY

In an exemplary embodiment, a computer storage medium has computer readable instructions stored thereon that, when executed by a computer, implement a method creating a dynamically linked computer program function package, the method including establishing an attribute, each attribute exhibiting a plurality of at least one of variations, characteristics and parameters associated with a specific computer program function; obtaining a source file associated with the specific computer program function; compiling the source file iteratively to create a plurality of corresponding object files based on the at least one of variations, characteristics, and parameters for each the attribute, wherein each iteration of the compiling the source file results in the plurality of object files having the specific computer program function but with each object file having distinct attributes from one another; and linking the plurality of resulting object files to create a single executable file, such that the single executable file comprises different versions of the specific computer program function; and wherein the single executable file is configured to facilitate choice of a selected version of the specific computer function based on a particular the at least one of variations, characteristics, and parameters for each the attribute.

In another embodiment, a system for packaging a dynamically linked computer program function includes a compiler configured to compile a source file iteratively to create a plurality of corresponding object files, the source file associated with a specific computer program function having an established an attribute, with each attribute exhibiting a plurality of at least one of variations, characteristics and parameters, wherein the compiling is based on the at least one of variations, characteristics, and parameters for each the attribute, wherein each iteration of the compiling the source file results in the plurality of object files having the specific computer program function but with each object file having distinct attributes from one another; and a linker configured to link the plurality of resulting object files to create a single executable file, such that the single executable file comprises different versions of the specific computer program function; and wherein the single executable file is configured to facilitate choice of a selected version of the specific computer function based on a particular the at least one of variations, characteristics, and parameters for each the attribute.

BRIEF DESCRIPTION OF THE SEVERAL VIEWS OF THE DRAWINGS

These and other objects and advantages of the present invention may be best understood by reading the accompanying detailed description of the exemplary embodiments while referring to the accompanying figures wherein like elements are numbered alike in the several figures in which.

The detailed description explains the preferred embodiments of our invention, together with advantages and features, by way of example with reference to the drawings.

DETAILED DESCRIPTION

Figure 1:
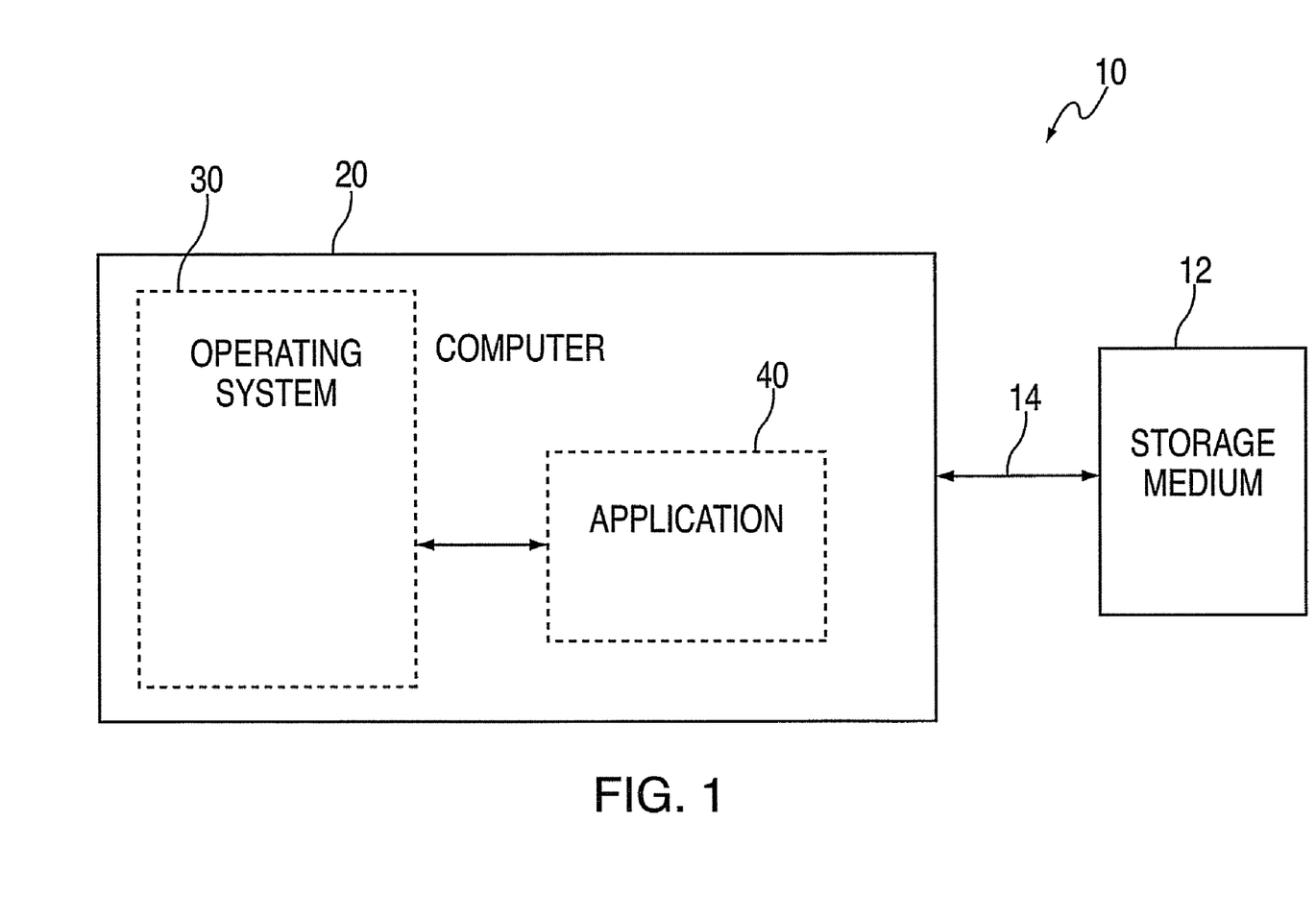
FIG. 1 is a simplified block diagram for implementation of the system and methodology in accordance with an exemplary embodiment.
Figure 2:
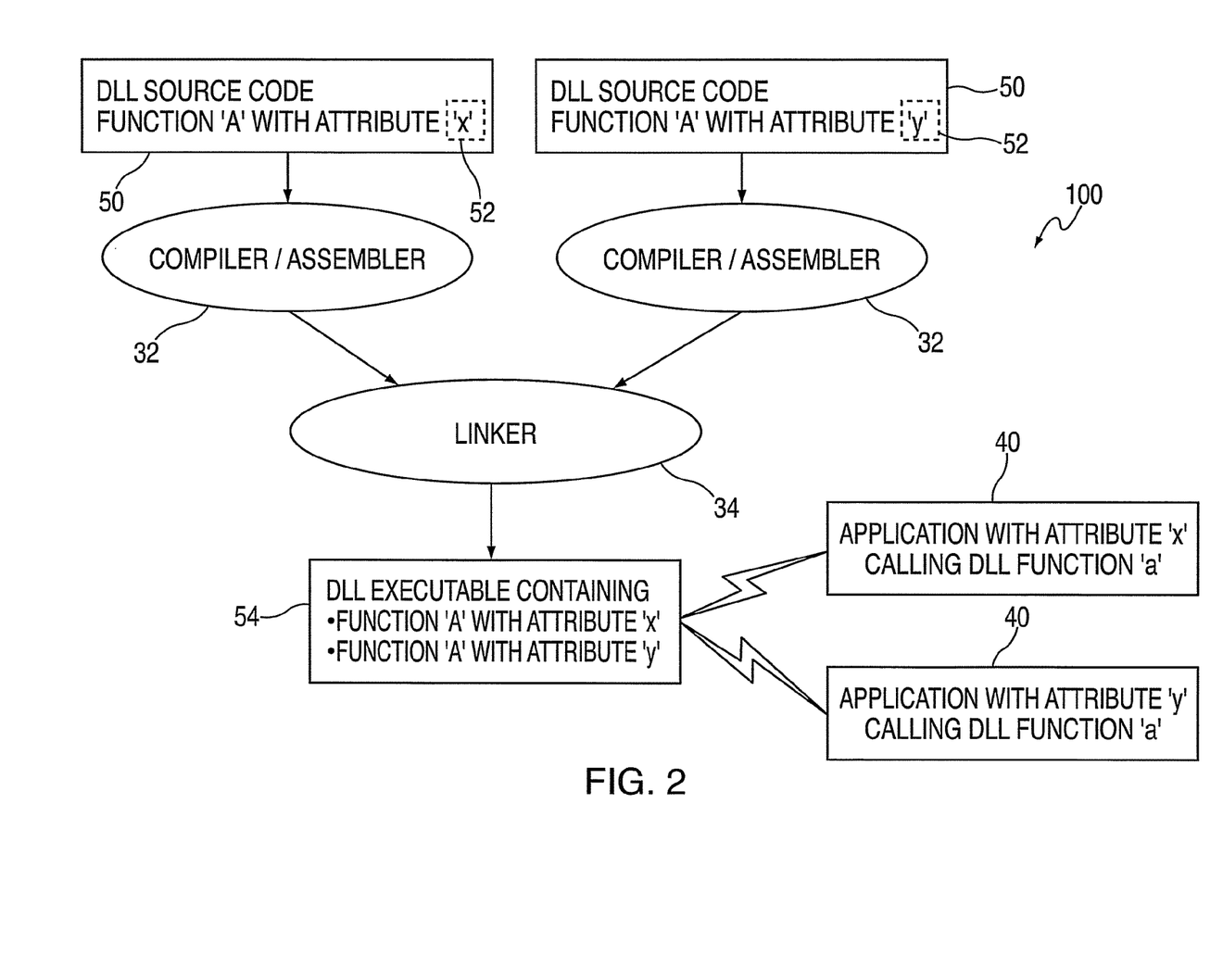
FIG. 2 is a simplified block diagram depicting the methodology in accordance with an exemplary embodiment.

Referring now to FIG. 1 and FIG. 2, a simplified block diagram depicting computer system 10 for implementation of the various embodiments disclosed herein and the interaction between an application and various DLL's is provided. In an exemplary embodiment a packaging methodology 100 including appropriate operating system support to build and load a DLL executable 54 with correct DLL attributes 52 is disclosed. In particular, a methodology 100 is provided to support DLLs with different attributes employing the same function name for application transparency. The attributes may include, but not be limited to: addressability, either 64-bit or 32-bit; character code base, for example, ASCII or EBCDIC (this could be generalized to any character set that a specific operating system supports, for example UCS-2, UCS-4 & etc.); system linkage conventions; machine architecture or floating points hardware, versioning, and the like, as well as combinations including at least one of the foregoing.

To facilitate understanding and appreciation of the disclosed embodiment, an illustration is provided depicting the formation and operation of existing Dynamic Link Libraries 50. DLLs 50 provide a mechanism for packaging multiple functions within a single executable 54 (e.g., load module or program object). For example, consider an illustrative example with the functions foo( ) and bar( ), which are marked as exported to be packaged into a DLL executable 54:

---
DLLA.c:
---
```
#pragma export(foo)
#pragma export(bar)
void foo(void) {
    printf("inside function foo\n");
}
void bar(void) {
    printf("inside function bar\n");
}
```
---

These functions can be compiled and link-edited into a single executable that can be accessed as a DLL (for example, using the z/OS® C compiler option DLL, and the z/OS® Binder option DYNAM=DLL):

c89 -c -o DLLA.o -Wc,dll DLLA.c
c89 -o DLLA -Wl, "DYNAM=DLL" DLLA.o

Doing so will create a single executable DLL named DLLA, and a text file (also referred to as a side deck) named DLLA.x that looks like:

IMPORT CODE,DLLA,'foo'
IMPORT CODE,DLLA,'bar'

Also, an internal structure is created inside the DLL executable 54 that might look something like:

TABLE 1

| Exported Function | Exported Function Address |
|---|---|
| Foo | 0x12345600 |
| Bar | 0x12345800 |

The side deck can be used when link-editing an application that calls the functions inside the DLL. An example of such an application might be:

---
```
extern void foo(void);
extern void bar(void);
int main(void) {
    foo( );
    bar( );
}
```
---

When this application is compiled and link-edited, and the side deck is included, an internal structure is created so that when the application is run, the DLL (e.g., DLLA) will be located and loaded, and references to the exported functions (e.g., foo( ) and bar( )) are relocated so that they can be called. This internal structure might look something like:

TABLE 2

| Imported DLL | Imported Function | Local reference to relocate |
|---|---|---|
| DLLA | foo | 0x23445600 |
| DLLA | bar | 0x23445620 |

When the application is executed, the run-time library that handles DLL loading and relocation can determine from this structure the name of the DLL executable 54 to load (e.g., DLLA) and the name of the DLL function to call. The DLL function will be located in the structure containing the list of exported functions in the DLL executable 54, and its address will be obtained so it can be relocated within the calling application.

On many computing platforms there is the idea of compiling a function with different "attributes" that determine that function's run-time characteristics. For example, some possible attributes might be:

ASCII versus EBCDIC—determines the internal representation for character data

HEX versus IEEE—determines the internal representation to use for floating point numbers 32-bit versus 64-bit—determines the addressing mode for execution.

A vendor (e.g., an application developer), providing a library of functions wanting to expose that library to the widest possible customer set would want to build the library of functions with many different combinations of these attributes. Using the existing methodologies for DLL implementation described above, the vendor providing the library would need to build a DLL for each combination of attributes they wish to support. Therefore, for example, they might build and ship the following DLLs (using z/OS® C compiler options, for example):

DLL name: DLLA_ASCII_IEEE_64
compiled with -Wc, "ASCII,FLOAT(IEEE),LP64"
DLL name: DLLA_EBCDIC_HEX_32
compiled with -Wc, "NOASCII,FLOAT(HEX)"
DLL name: DLLA_EBCDIC_HEX_64
compiled with -Wc, "NOASCII,FLOAT(HEX),LP64"

It is noteworthy to appreciate that each DLL "flavor" must be packaged in a separate executable. This also means each DLL would have its own side deck. These DLL executables and their associated side decks unfortunately, need to be managed by the user of the library.

Continuing with FIG. 2, in an exemplary embodiment, a coordinated system function is provided to allow application providers to build DLL executables 54 with different attributes. The operating system 30 is configured to have the intelligence to recognize the application 40 and DLL attributes 52 in an execution environment. The system functions include the compiler 32, linker 34 (or their equivalents for operating systems that employ different terminology), and loader (not shown). The compiler 32 provides the capability to compile programs to produce DLL object files with attributes as a logical extension to the function name. These attributes will be part of the object file with explicit attributes identified. The linker 34 understands where to obtain the DLL attributes information, in order to bind the program object correctly. The application imports the DLL executable 54 and executes the DLL logic. The system loader supports and understands the DLL attributes and determine the correct DLL to be loaded.

In an exemplary embodiment, the main idea is to "decorate" the DLL function names based on some attributes 52. For example, the attributes 52 used are compile characteristics of the functions. As an example of a technique to "decorate" the DLL function names, consider the following abbreviations:

| | | |
|---|---|---|
| ASCII | 'A' | |
| EBCDIC | 'E' | |
| HEX | 'H' | |
| IEEE | 'I' | |
| 31-Bit | '3' | |
| 64-Bit | '6' | |

With this solution, the same DLL function(s) may be compiled with different options (i.e., attributes) and packaged in the same executable 54. Since their external names may not be unique within the executable, their attributes are used to further distinguish the functions. The internal table within the DLL listing the exported functions is further enhanced to include the attributes of each function. Using the library of functions example from above, some possible combination of attributes might be:

TABLE 3

| Exported Function | Exported Function Address | Exported Function Attrs |
|---|---|---|
| foo | 0x12345600 | A_I_6 |
| bar | 0x12345800 | A_I_6 |
| foo | 0x12345AOO | E_H_3 |
| bar | 0x12345C00 | E_H_3 |
| foo | 0x12345EOO | E_H_6 |
| bar | 0x12346000 | E_H_6 |

When resolving the DLL reference from the calling application at run-time, the same internal structure in the application might be used, but in conjunction with the attributes of the calling application. For example, if the calling application has the attributes ASCII, FLOAT(IEEE), 64-Bit and calls the DLL function bar( ), then at run-time a DLL file named DLLA would be loaded, and the reference to this instance of the function bar( ) would be relocated to address 0x12345 800 (from the table above). This solution has the primary advantage of only requiring a single DLL and a single side deck, making the task of managing the build environment for an application much simpler.

The disclosed embodiments lend themselves to many different types of "attributes", different encodings for those attributes, and the like. However, the basic premise holds, that references to functions contained in a DLL can be distinguished, both in the caller and in the DLL itself, using these "attributes" in combination with the name of the DLL function itself.

Continuing now with another illustration of an exemplary embodiment including various attributes with an explanation and code illustration of the operation of an exemplary embodiment:

A function foo( ) is defined in a DLL source file denoted DLLA.c:

```
#pragma export(foo)
void foo( ) { printf("Hello World\"); }
```

In this illustration, foo( ) is a common function that can run in multiple operating environments with various attributes.

Compiling DLLA.c with different attributes yields the following: (the syntax is designed for illustration only)
c89 -o DLLA.ebcdic.o -c -Wc,EBCDIC DLLA.c;
c89 -o DLLA.ascii.o -c -Wc,ASCII DLLA.c;
c89 -o DLLA.ieee.o -c -Wc,IEEE DLLA.c;
c89 -o DLLA.hex.o -c -Wc,HEX DLLA.c;
c89 -o DLLA.oslink.o -c -Wc,OSLINK DLLA.c; and
c89 -o DLLA xplink.o -c -Wc,XPLINK DLLA.c.

Figure 3:
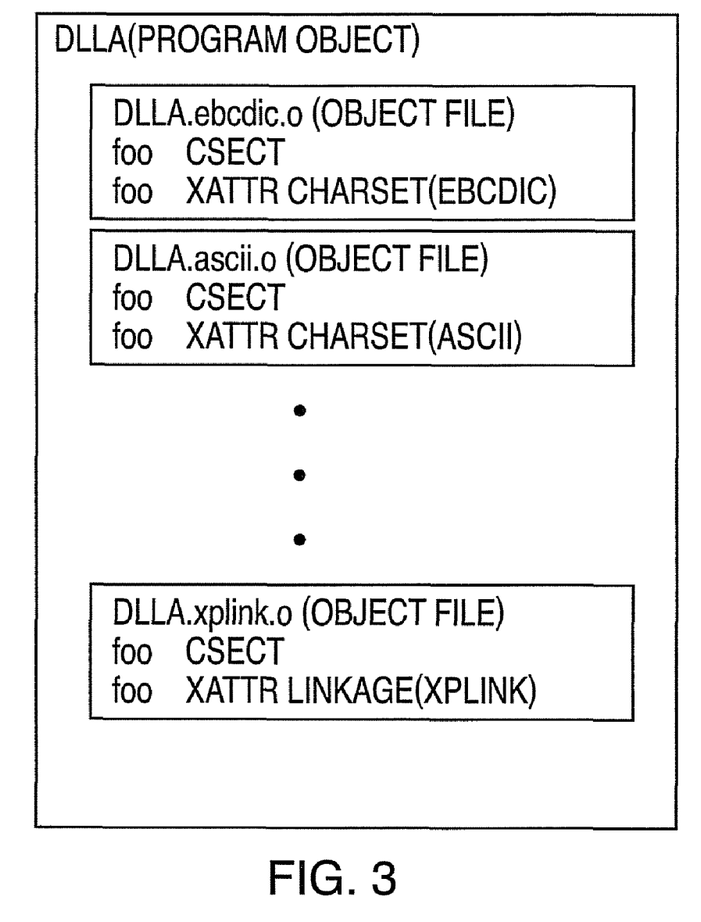
FIG. 3 is a diagram depicting illustrative DLLA program objects.

FIG. 3 is a diagram depicting illustrative DLLA program objects.

Binding the different attributes DLL object files together to form a multi-attribute DLL executable package 54. The binding step produces a side deck file denoted DLLA.x. The various attributes with DLL objects are bound in one program object such as:
c89 -o DLLA DLLA.ebcdic.o DLLA.ascii.o DLLA.ieee.o DLLA.hex.o dllA.oslink.o DLLA.xplink.o.

Next, considering an application denoted MYAPPL.C invoking the function foo( ). The source file MYAPPL.c may look like:

```
IMPORT CODE, DLLA, foo
void foo( );
main( ) {foo( );}
```

The MYAPPL executable can be built as follows:
c89 -o MYAPPL.ebcdic -Wc,DLL MYAPPL.c DLLA.x.

Advantageously, it can be seen now that when the application MYAPPL is built (linked), the appropriate function foo( ) possessing the EBCDIC attribute is selected from the DLL (foo with attributes E_H_3, as illustrated in Table 3 above). Thus when MYAPPL calls function foo( ), the operating system has knowledge of the MYAPPL EBCDIC attribute provided during linking and thus selects the appropriate object code in DLLA, i.e., DLLA.ebcdic.o for execution.

The above example is a simple illustration of the operation of an exemplary embodiment in a multi-attribute DLL environment. Advantageously, the benefits of the disclosed embodiments may be readily extended to support multiple combinations of attributes for a particular DLL package. In addition, for 32-bit and 64-bit DLLs, it may be reasonable to build separate 32-bit and 64-bit DLL executable packages. However, within the 32-bit or 64-bit DLL executable package 54, there may still be numerous choices for different attributes. Therefore, in another exemplary embodiment, an extension of the disclosed embodiment is to create a logical hierarchy for the attributes. Thus, for example, an application or operating system provider can build a 32-bit or 64-bit DLL executable package 54 with different attributes as follows:
C89 -o MYAPPL32.ebcdic -Wc, DLL MYAPPL32.c DLLA32.x or
C89 -o MYAPPL64.ebcdic -Wc, DLL MYAPPL64.c DLLA64.x.

An advantage of this embodiment is the ability to facilitate common code base development in the ever-emerging application development environment. The DLL provider can develop a common code base and compile the source to support different attributes. Should an error be discovered in the base code, the recompiling and rebinding task becomes a routine automated task. On the contrary, with the existing art, different version of DLL source code based on different attributes would need to be retrofit. The capabilities provided by the exemplary embodiments disclosed herein provide the motivation to DLL providers to continue to support existing environment for compatibility and at the same time to be able to support the emerging application attributes in a most efficient manner. An additional advantage of the disclosed embodiments is that they are operating system independent and may be implemented in almost any operating system that can be configured to provide this flexibility.

Another common problem today for application developers is the management of dependent software. The rate at which software products are evolving makes it very difficult to test ones own product's interaction with dependent products and deliver it before a new version of the dependent software becomes available. This problem is further exacerbated when the dependent software is produced by a variety of other companies.

Figure 4:
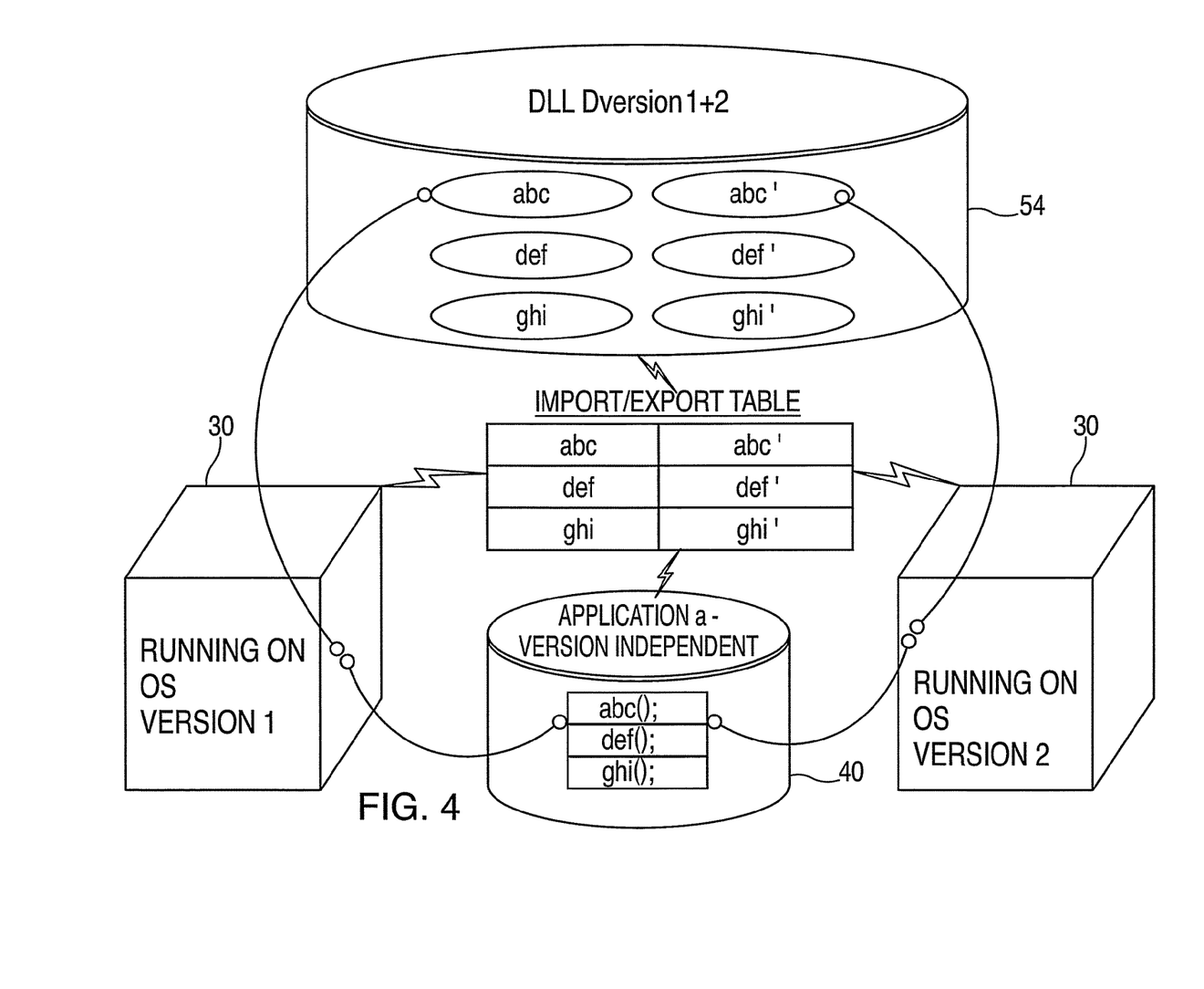
FIG. 4 is a simplified block diagram depicting the methodology in accordance with an exemplary embodiment.

Referring now to FIG. 4 as well, as stated previously, the above-disclosed embodiments "decorate" function names based on various attributes. It will now be appreciated that this may be expanded further, to other characteristics, including, but not limited to, the 'version' of the software. Note that an important element of this idea is that it can be implemented with a change only to the compiler 32 and/or linker 34 and does not require any changes to or special functionality of the linker 34.

As an example, consider a product such as a C++ computer programming language Class Library, and the dependency of both the library product and the customer's application code on the definition of the classes. In the C++ computer programming language those class definitions are processed at compilation into program code in a manner that is determined solely by the compiler. The applications developer cannot dictate the underlying structure. The result is that C++ classes are usually not compatible from version to version. When a developer changes a class (e.g., at a new release of their product), they must rebuild and reship their product (the C++ Class Library in this instance). However, they must also require that the application user to rebuild their own application with the new class definitions as well, in order to be able to run the application along with the new release of the developer's product. Many customers/users have no desire to modify/rebuild an application that is working well. On the other hand, the applications developers recognize that they need to produce new releases of their products to satisfy other customer's needs.

To facilitate operations, continued use, and satisfaction of current customers who do not wish to rebuild their applications, a developer could employ a variation of the exemplary embodiments disclosed herein. That is, to "decorate" the names of the functions (or methods) within the product (e.g., a C++ Class Library) with a 'version identifier'. The "version identifier" would permit the developer to package multiple versions of their product (e.g., the C++ Class Library) in one "file", such that this one file would appear to any given user to be only the version that they require. More specifically, the "version identifier" would facilitate "selection" of the appropriate version of the product by the various users.

To illustrate, consider that the product (C++ Class Library) contained the following three functions (or methods), and there is a Version v1 and a Version v2 implementation of this product.

TABLE 4

| Defined function/ method name | Version v1 symbols | Version v2 symbols |
| --- | --- | --- |
| abc | abc_V1 | abc_V2 |
| def | def_V1 | def_V2 |
| ghi | ghi_V1 | ghi_V2 |

In this case the application developer would need to "decorate" the function or method names in a controlled or scoped fashion, so that the attribute which is to be a version identifier would be applied to a particular subset of the symbols in their entire application. There are several possible techniques for applying the version specifier in such a fashion. They would all require that the source code be modified (specifically the "header" files supplied to the user by the product provider). Similarly, as in the previous embodiments, the application developer would be able to compile their source code with a specific version specifier, and the product provider (DLL developer) would compile their source code at different levels, with the different version specifiers. The product provider would then link-edit all versions into a single DLL, producing a single side-deck file, both of which contained all the symbols for every version.

For possible techniques are given as an example with illustration for C and C++ programming languages:

A new #pragma. This would be applicable to C and C++ equally: #pragma version(version_name)

A new keyword qualifier. This would be applicable to C and C++ equally: version (version_name)

An extension to the namespace keyword. This approach is only possible with C++:

namespace namespace_name [version version_name]

An implicitly identified version based, for example, on the level of compiler used to compile the source.

In addition, the product provider would need to version their entire DLL much as in the fashion of the first embodiment. This could be done with a new compiler option, such as: VERSION(version_name).

This option would be similar to current the z/OS®:C/C++, CSECT( ) option, but would affect all symbols produced by the compiler for consumption by the particular linker. It would follow the same scoping rules that would be necessary for the first embodiment, where effectively the version_name is another attribute specified by the developer.

Another problem that is common for developers or product providers arises with the evolution of utilities. In the life cycle of a utility, it often will become dependent on specific new features of the operating system, run-time library, or other elements of the infrastructure that it is configured to operate with. The difficulty encountered is that multiple versions of the utility must be separately maintained, and the user must be sure to install the "appropriate" version, which matches the version of the operating system on which they are running the utility.

To alleviate this problem, another exemplary embodiment may be employed that permits a utility provider to create a single utility, which dynamically runs the "correct" version of the utility for the target operating system. Once again, this may be accomplished as an extension to the above embodiments, with the utilization of a small wrapper program. An illustrative wrapper program might look like:

```
Namespace myns version v1 {
Int utility_main( );
Namespace myns version v1_1 {
Int utility_main( );
}
Int main( ) {
if (SYSTEM_LEVEL >= 2) {
  using namespace myns version v1_1;
    Return utility_main;
  }
Else {
    using namespace myns version v1;
    Return utility_main( );
    }
  }
```

Note:
This example is C++ programming language based. A C programming language based implementation could use the abovementioned version keyword qualifier instead.

In summary, the disclosed embodiments facilitate employing different variations of source programs that contain the same symbol names, to be link-edited into a single executable file. This capability lends itself to a variety of situations in which a developer can deliver products to a customer, and provide the customer with different versions of those products, while relieving many of the difficulties normally associated with the packaging of the different versions of a product.

The disclosed invention can be embodied in the form of computer, controller, or processor implemented processes and apparatuses for practicing those processes. The present invention can also be embodied in the form of computer program code containing instructions embodied in tangible media 12, such as floppy diskettes, CD-ROMs, hard drives, or any other computer-readable storage medium, wherein, when the computer program code is loaded into and executed by a computer, controller 20, or processor, the computer, controller, or processor 20 becomes an apparatus for practicing the invention. The present invention may also be embodied in the form of computer program code as a data signal 14, for example, whether stored in a storage medium, loaded into and/or executed by a computer, controller, or processor 20, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose processor 20, the computer program code segments configure the processor 20 to create specific logic circuits.

It will be appreciated that the use of first and second or other similar nomenclature for denoting similar items is not intended to specify or imply any particular order unless otherwise stated.

It should be appreciated that while the exemplary embodiments disclosed herein are illustrated by reference to z/OS® operating system and C or C++ programming languages/compilers, the concepts of the invention(s) disclosed herein are applicable to various operating systems and applications programming languages without limitation. Similarly, while an exemplary embodiment has been applied to dynamic linked libraries, those skilled in the art will recognize and appreciate that the invention(s) disclosed herein may readily be applicable to other programming aspects.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A non-transitory computer storage medium having computer readable instructions stored thereon that, when executed by a computer, implement a method creating a dynamically linked computer program function package, the method comprising:
   establishing attributes, each attribute exhibiting a plurality of at least one of variations, characteristics, and parameters associated with a specific computer program function;
   obtaining a source file associated with the specific computer program function;
   compiling the source file iteratively to create a plurality of corresponding object files based on the at least one of variations, characteristics, and parameters for each attribute, wherein each iteration of the compiling of the source file results in the plurality of corresponding object files having the specific computer program function but with each corresponding object file having distinct attributes from one another; and
   linking the plurality of corresponding object files to create a single executable file, such that the single executable file comprises different versions of the specific computer program function;
   wherein the single executable file is configured to facilitate choice of a selected version of the specific computer program function based on a particular of the at least one of variations, characteristics, and parameters for each attribute;
   wherein the attributes include: version, addressability, character code base, character set that a specific operating system supports, system linkage conventions, machine architecture, or floating point hardware; and
   wherein the at least one of variations, characteristics, and parameters for each attribute includes: 64-bit versus 32-bit addressing, ASCII versus EBCDIC, internal representation for character data, or HEX versus IEEE representation to use for floating point data.

2. The non-transitory computer storage medium of claim 1, wherein the method further comprises configuring an application to be responsive to the selected version of the specific computer program function based on the particular of the at least one of variations, characteristics, and parameters for each attribute.

3. The non-transitory computer storage medium of claim 2, wherein the configuring includes compiling based on the particular of the at least one of variations, characteristics, and parameters for each attribute.

4. The non-transitory computer storage medium of claim 1, wherein the attributes are user specified.

5. The non-transitory computer storage medium of claim 1, wherein the attributes are implicitly defined.

6. The non-transitory computer storage medium of claim 1, wherein the at least one of variations, characteristics, and parameters for each attribute is user specified.

7. A system for packaging a dynamically linked computer program function, comprising:

a processor;

a compiler configured to compile a source file iteratively to create a plurality of corresponding object files, the source file associated with a specific computer program function having established attributes, with each attribute exhibiting a plurality of at least one of variations, characteristics, and parameters, wherein the compiling is based on the at least one of variations, characteristics, and parameters for each attribute, wherein each iteration of the compiling of the source file results in the plurality of corresponding object files having the specific computer program function but with each corresponding object file having distinct attributes from one another; and a linker configured to link the plurality of corresponding object files to create a single executable file, such that the single executable file comprises different versions of the specific computer program function;

wherein the single executable file is configured to facilitate choice of a selected version of the specific computer program function based on a particular of the at least one of variations, characteristics, and parameters for each attribute;

wherein the attributes include: version, addressability, character code base, character set that a specific operating system supports, system linkage conventions, machine architecture, or floating point hardware; and wherein the at least one of variations, characteristics, and parameters for each attribute includes: 64-bit versus 32-bit addressing, ASCII versus EBCDIC, internal representation for character data, or HEX versus IEEE representation to use for floating point data.

8. The system of claim 7, further comprising configuring an application to be responsive to the selected version of the specific computer program function based on the particular of the at least one of variations, characteristics, and parameters for each attribute.

9. The system of claim 8, wherein the application is compiled based on the particular of the at least one of variations, characteristics, and parameters for each attribute.

10. The system of claim 7, wherein the attributes are user specified.

11. The system of claim 9, wherein the attributes are implicitly defined.

12. The system of claim 7, wherein the at least one of variations, characteristics, and parameters for each attribute is user specified.

* * * * *